(12) United States Patent
Winiarski

(10) Patent No.: US 10,884,983 B2
(45) Date of Patent: Jan. 5, 2021

(54) METHOD AND SYSTEM FOR IMPLEMENTING HEADER AND TRAILER RECORD VALIDATIONS

(71) Applicant: JPMorgan Chase Bank, N.A., New York, NY (US)

(72) Inventor: Robert A. Winiarski, Valrico, FL (US)

(73) Assignee: JPMorgan Chase Bank, N.A., New York, NY (US)

( * ) Notice: Subject to any disclaimer, the term of this patent is extended or adjusted under 35 U.S.C. 154(b) by 219 days.

(21) Appl. No.: 16/170,777

(22) Filed: Oct. 25, 2018

(65) Prior Publication Data

US 2020/0134028 A1    Apr. 30, 2020

(51) Int. Cl.
     *G06F 16/16*      (2019.01)

(52) U.S. Cl.
     CPC .................. *G06F 16/164* (2019.01)

(58) Field of Classification Search
     CPC .... G06Q 10/06; G06Q 30/02; G06Q 30/0202; G06F 9/52; G06F 9/00; G06F 3/04845; G06F 9/5072; G06F 16/164; G16H 40/67; G11B 27/322
     See application file for complete search history.

(56) References Cited

U.S. PATENT DOCUMENTS

| | | | |
|---|---|---|---|
| 4,395,757 A * | 7/1983 | Bienvenu | G06F 9/52 718/104 |
| 6,006,220 A | 12/1999 | Haderle | |
| 6,044,216 A | 3/2000 | Bhargava | |
| 7,389,256 B1 * | 6/2008 | Adams | G06Q 20/02 705/35 |
| 9,690,577 B1 | 6/2017 | Crew | |
| 9,843,532 B1 * | 12/2017 | Shani | G06F 9/5072 |
| 10,545,957 B1 | 1/2020 | Winiarski | |
| 2001/0037224 A1 * | 11/2001 | Eldridge | G06Q 30/02 705/4 |
| 2005/0256834 A1 | 11/2005 | Millington | |
| 2006/0004745 A1 | 1/2006 | Kuhn | |
| 2007/0208695 A1 | 9/2007 | Burger | |
| 2007/0282837 A1 | 12/2007 | Klein | |
| 2008/0016047 A1 | 1/2008 | Dettinger | |
| 2008/0098033 A1 | 4/2008 | Farrar | |
| 2008/0104151 A1 * | 5/2008 | Tanaka | G11B 27/322 |

(Continued)

OTHER PUBLICATIONS

U.S. Appl. No. 15/790,376, filed Oct. 2017, Winiarski; Robert A.

*Primary Examiner* — Etienne P Leroux
(74) *Attorney, Agent, or Firm* — Hunton Andrews Kurth LLP

(57) ABSTRACT

The invention relates to header and trailer record validation for batch files. According to an embodiment of the present invention, a computer implemented system implements a Header/Trailer Validation Tool. The Header/Trailer Validation Tool may read a control file containing pertinent information of each file to be validated. Key information may be determined at run time and the Header/Trailer Validation Tool may process the files dynamically. An embodiment of the present invention may also process any number of files in a single execution—this is particularly useful because in some cases a set of files may be received from another application, but not all the files may be used at the same time.

16 Claims, 9 Drawing Sheets

(56) References Cited

U.S. PATENT DOCUMENTS

| | | |
|---|---|---|
| 2011/0029321 A1* | 2/2011 | Rourke .................. G16H 40/67 |
| | | 705/2 |
| 2011/0113054 A1 | 5/2011 | McLean |
| 2011/0161371 A1 | 6/2011 | Thomson |
| 2012/0198416 A1 | 8/2012 | Sirr et al. |
| 2013/0138626 A1 | 5/2013 | Delafranier |
| 2013/0204450 A1 | 8/2013 | Kagan |
| 2014/0157154 A1* | 6/2014 | Brunswig ............... G06Q 10/06 |
| | | 715/762 |
| 2015/0046856 A1* | 2/2015 | Rucker ............... G06F 3/04845 |
| | | 715/765 |
| 2016/0283584 A1 | 9/2016 | Dubost |
| 2017/0017962 A1* | 1/2017 | Knoblauch ............... G06F 9/00 |
| 2019/0080340 A1* | 3/2019 | Berger ............... G06Q 30/0202 |

* cited by examiner

METHOD AND SYSTEM FOR IMPLEMENTING HEADER AND TRAILER RECORD VALIDATIONS

CROSS REFERENCE TO RELATED APPLICATIONS

This application is related to co-pending application U.S. Ser. No. 15/643,569, filed Jul. 7, 2017, which claims priority to U.S. Provisional Application 62/359,774, filed Jul. 8, 2016, the contents of which are incorporated herein in their entirety.

This application is also related to co-pending application U.S. Ser. No. 15/790,376, filed Oct. 23, 2017, which claims priority to U.S. Provisional Application 62/411,083, filed Oct. 21, 2016, the contents of which are incorporated herein in their entirety.

FIELD OF THE INVENTION

The present invention generally relates to validating header and trailer records in batch files.

BACKGROUND OF THE INVENTION

Currently, writing code for header and trailer record validation is a manual and labor intensive process that requires individually processing inbound files received from various other applications. It is a very time-consuming task to add and test new code to process header and trailer records in every individual program. Furthermore, additional regression testing would be needed on every program involved in order to make sure that existing functions were not disturbed. Without proper header and trailer record validation, an entity is not able to maintain or verify the integrity of such files.

These and other drawbacks exist.

SUMMARY OF THE INVENTION

Accordingly, one aspect of the invention is to address one or more of the drawbacks set forth above. According to an embodiment of the present invention, a computer implemented system implements a header and trailer validation tool for batch files. The system comprises: a memory interface that accesses a database table; an interactive interface that receives a user selection; and a processor, coupled to the memory interface and the interactive interface, the processor configured to perform the steps comprising: receiving a plurality of files from a plurality of applications; for each file, accessing a control card to identify a header format and a trailer format; retrieving a filename from the control card; dynamically reading a file corresponding to the filename; for each record of the file, identifying a header field based on the header format and identify a trailer field based on the trailer format; and at the end of the file, confirming that the header field corresponds to the header format and confirm that the trailer field matches a number of records in the file.

According to another embodiment of the present invention, a computer implemented method implements a header and trailer validation tool for batch files. The method comprises the steps of: receiving a plurality of files from a plurality of applications; for each file, accessing a control card to identify a header format and a trailer format; retrieving a filename from the control card; dynamically reading a file corresponding to the filename; for each record of the file, identifying a header field based on the header format and identify a trailer field based on the trailer format; and at the end of the file, confirming that the header field corresponds to the header format and confirm that the trailer field matches a number of records in the file.

The computer implemented system, method and medium described herein provide unique advantages to entities, organizations and other users (e.g., developers, quality assurance teams, testing departments, etc.), according to various embodiments of the invention. An embodiment of the present invention is directed to performing header/trailer record validation on batch files or flat files that are received from various other applications. By using Header/Trailer Validation Tool and its corresponding cataloged procedure and control cards, an embodiment of the present invention is able to add a separate step to a job to perform the header/trailer record validation. The innovative design enables the ability to add the validation without having to change any other program in that particular job. This approach further minimizes development and testing. These and other advantages will be described more fully in the following detailed description.

BRIEF DESCRIPTION OF THE DRAWINGS

In order to facilitate a fuller understanding of the present inventions, reference is now made to the appended drawings. These drawings should not be construed as limiting the present inventions, but are intended to be exemplary only.

DESCRIPTION OF EMBODIMENTS OF THE INVENTION

Figure 1:
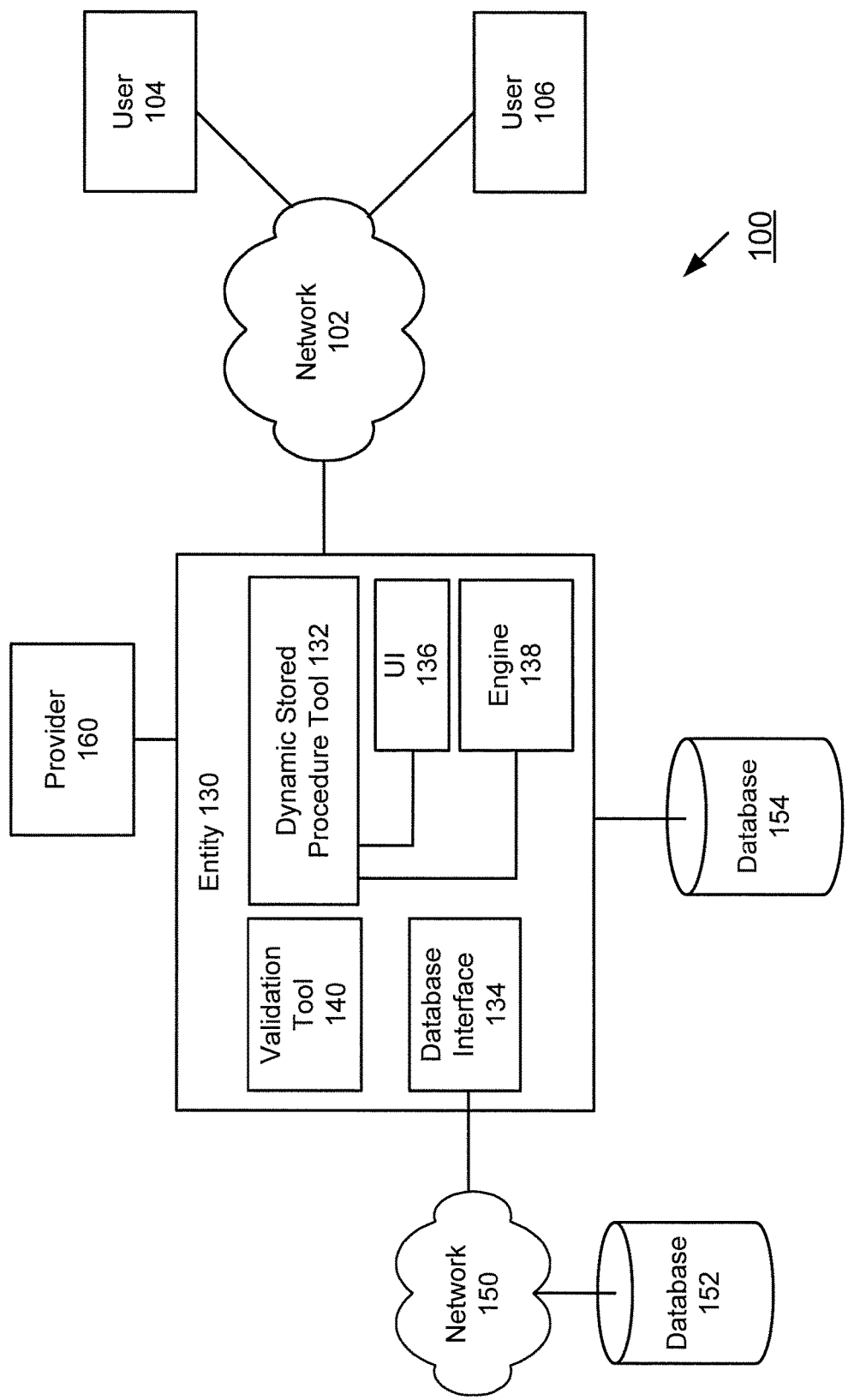
FIG. 1 is an exemplary system diagram for implementing a Header and Trailer Validation Tool, according to an embodiment of the present invention.

The following description is intended to convey an understanding of the present invention by providing specific embodiments and details. It is understood, however, that the present invention is not limited to these specific embodiments and details, which are exemplary only. It is further understood that one possessing ordinary skill in the art, in light of known systems and methods, would appreciate the use of the invention for its intended purposes and benefits in any number of alternative embodiments, depending upon specific design and other needs.

As the names suggest, a Header record is the first one in the file and the Trailer is the last. Generally, the Header record contains a date and the Trailer record contains a record count. Validation may involve confirming the date in the header record matches a proper date in a proper format. The proper date may be the system date or it may be a file-specific business date. According to another example, the proper date may even be a date range. Validation of the trailer record may involve confirming the number of records matches the record count.

Depending on the file, the header and trailer may have varying formats. For example, a first character or a first couple of characters in the record may identify a record type. It may be a single character, e.g., "H" for header, "D" for detail and "T" for trailer. Other applications may have different formats, such as "01" for header and "99" for trailer. In addition, a date format may also vary based on application. In the example involving a financial institution, bank branches may be in varying locations with different corresponding time zones. An embodiment of the present invention may synchronize the date with a business date for a particular branch and further consider varying holiday schedules and other region specific differences in schedules. Also, varying countries may support different date formats (e.g., date-month-year sequence). Generally, the trailer may include a field that represents a count (e.g., a number of records). The count may represent a total number of records in the file that includes the header and trailer as part of the count. For other applications, the count may exclude the header and/or trailer in the count.

An embodiment of the present invention is directed to a parameter-driven program that performs header/trailer validation on any file sent by another application. The program may be contained in a cataloged procedure which integrates a set of lines of JCL (Job Control Language) into any job that needs to perform header/trailer validation. An embodiment of the present invention may be easily and simply implemented wherever it is needed. In addition, adding this innovative validation logic does not interfere with existing programs that are already part of the job in question. This greatly reduces the amount of testing required and allows users to deploy into production quickly. The innovative process may easily be used by another mainframe application.

An innovative and novel feature of a Header/Trailer Validation Tool is its ability to perform its tasks dynamically. The Header/Trailer Validation Tool may read a control file containing pertinent information of each file to be validated. For example, the control file may contain the name of the input file to validate, the defining characteristics of the header and trailer records, the location and format of the date in the header record, etc. It does not need to know anything about the file(s) it is going to process ahead of time. Key information may be determined at run time and the Header/Trailer Validation Tool may process the files dynamically. An embodiment of the present invention may also process any number of files in a single execution—this is particularly useful because in some cases a set of files may be received from another application, but not all the files may be used at the same time. By validating them in one place, an embodiment of the present invention may identify any problems early in the processing.

An embodiment of the present invention provides flexibility and is easy to customize and may be further added to any job. According to an exemplary embodiment, a new control card that describes the properties of the file in question may be created. An embodiment of the present invention may add Header/Trailer validation logic to a target job. Accordingly, there is no need to recompile Header/Trailer validation logic in order to process a new file. In addition, default values for the process may be stored in a DB2 table. According to an exemplary embodiment, using the DB2 table in this manner provides default and/or override values on several levels. For example, an embodiment of the present invention may establish these default values for a single job, a "family" or set of related jobs, or even every job that uses a parameter driven program. These settings may be updated in just a few minutes and without any change to the program itself.

An embodiment of the present invention may receive a number of files for different branch locations (e.g., states, countries, regions). The dates in the header records are often related to the end-of-day process for a particular country. By the time a file is received for Singapore, for example, the calendar date may have changed due to the time zones involved. Whenever specified, a Header/Trailer Validation Tool allows for time-zone and date differences by accessing a key DB2 table which stores a variety of calendar information by the branch. This calendar information may then be factored into an algorithm or tool to determine if the header date is valid.

An embodiment of the present invention may be directed to an online interface or portal to allow developers to modify any supporting DB2 tables directly. Another embodiment of the present invention may also replace some of the static SQL statements in a parameter driven program with dynamic SQL to make the program even more versatile. Other variations may be supported.

An embodiment of the present invention is directed to integrating a Header/Trailer Validation Tool with stored procedures that retrieve queries from a database, e.g., a DB2 table, and then prepares and executes dynamic SQL based on parameters supplied by a calling program. Additional details are provided in co-pending and commonly owned patent application U.S. Ser. No. 15/790,376, filed Oct. 23, 2017, which claims priority to U.S. Provisional Application 62/411,083, filed Oct. 21, 2016, the contents of which are incorporated herein in their entirety.

A stored procedure may represent a specialized program. A stored procedure may represent a compiled program that can execute SQL statements and is stored at a local or remote database server. For example, an entity may manage a customer information facility that provides data warehousing, where many different applications call various stored procedures. For example, an application may execute a stored procedure to retrieve a name and an address for a set of accounts by passing account identifiers. According to an exemplary illustration, the entity may execute 50, 60, 70 stored procedures on thousands and thousands of test cases.

For example, a stored procedure may be invoked from an application program or from the command line processor. A single call to a stored procedure from a client application may access the database at the server several times. A typical stored procedure may contain two or more SQL statements and some manipulative or logical processing in a host language or SQL procedure statements. Stored procedures may be called from other applications or from the command line.

For each test case, the system may call an appropriate stored procedure using the specified parameters. The program may display the test result output in addition to any available result sets, e.g., DB2 Result Sets, that the stored procedure creates. The results may then be saved by the user for documentation and/or auditing purposes, etc. Also, the results may be exported to another application, communicated to recipients, programs, systems, and further available for download by a user. Result sets may represent information from different tables, sources, etc. Also, result sets may represent results of a stored procedure in a particular format and may be further filtered or processed. For example, the stored procedure may process the result sets and display the information in an audit trail or other output.

According to an embodiment, the system may include an interactive user interface that may be accessible through various user devices, computer, laptop, smartphone, mobile devices, etc. The interface may include a web front-end to view and access ready-to-use cursors. With this feature, users may view predetermined ready-to-use cursors that may be generated and applied in real-time. The interface may also demonstrate the required input values for each cursor and provide sample output data.

FIG. 1 is an exemplary system diagram for implementing a Header and Trailer Validation Tool, according to an embodiment of the present invention. As illustrated in FIG. 1, Network 102 may be communicatively coupled with one or more data devices including, for example, computing devices associated with end users, represented by User 104, 106. Such devices may include computers, laptops, and mobile devices, including mobile phones, smart devices, etc. Entity 130 may include a Dynamic Stored Procedure Tool 132 that automates and facilitates execution and testing of stored procedures in accordance with the various embodiments of the present invention. Dynamic Stored Procedure Tool 132 may also incorporate modules and other functions, such as User Interface 136, Database Interface 144 and Engine 138. Validation Tool 140 may provide Header and Trailer validation. These modules are exemplary and illustrative, Validation Tool 140 may interact with additional modules, a combination of the modules described and/or less modules than illustrated. While a single illustrative block, module or component is shown, these illustrative blocks, modules or components may be multiplied for various applications or different application environments. In addition, the modules or components may be further combined into a consolidated unit. The modules and/or components may be further duplicated, combined and/or separated across multiple systems at local and/or remote locations. Other architectures may be realized.

Stored procedures may be stored and maintained by Databases 152, 154. For example, Database 152 may maintain stored procedures and corresponding parameters for each stored procedure at a remote location, accessible by Network 150. Database 152 may receive updates, revisions, requests and/or other actions on the data stored via Database Interface 134. The updates may be automatically implemented from various sources, applications, and systems. Also, Databases 152, 154 may also store and maintain output data in various formats as well as reports, performance data, etc. The Validation Tool described herein may be provided by Entity 130 and/or a third party provider, represented by 160, where Provider 160 may operate with Entity 130.

The system 100 of FIG. 1 may be implemented in a variety of ways. Architecture within system 100 may be implemented as hardware components (e.g., module) within one or more network elements. It should also be appreciated that architecture within system 100 may be implemented in computer executable software (e.g., on a tangible, non-transitory computer-readable medium) located within one or more network elements. Module functionality of architecture within system 100 may be located on a single device or distributed across a plurality of devices including one or more centralized servers and one or more mobile units or end user devices. The architecture depicted in system 100 is meant to be exemplary and non-limiting. For example, while connections and relationships between the elements of system 100 is depicted, it should be appreciated that other connections and relationships are possible. The system 100 described below may be used to implement the various methods herein, by way of example. Various elements of the system 100 may be referenced in explaining the exemplary methods described herein.

Network 102, 150 may be a wireless network, a wired network or any combination of wireless network and wired network. For example, Network 102, 150 may include one or more of an Internet network, a satellite network, a wide area network ("WAN"), a local area network ("LAN"), an ad hoc network, a Global System for Mobile Communication ("GSM"), a Personal Communication Service ("PCS"), a Personal Area Network ("PAN"), D-AMPS, Wi-Fi, Fixed Wireless Data, IEEE 802.11a, 802.11b, 802.15.1, 802.11g, 802.11n, 802.11ac, or any other wired or wireless network for transmitting or receiving a data signal. Also, Network 102, 150 may support an Internet network, a wireless communication network, a cellular network, Bluetooth, or the like, or any combination thereof. Network 102, 150 may further include one, or any number of the exemplary types of networks mentioned above operating as a stand-alone network or in cooperation with each other. Network 102, 150 may utilize one or more protocols of one or more network elements to which it is communicatively coupled. Network 102, 150 may translate to or from other protocols to one or more protocols of network devices. Although Network 102 and 150 are each depicted as one network for simplicity, it should be appreciated that according to one or more embodiments, Network 102, 150 may comprise a plurality of interconnected networks, such as, for example, a service provider network, the Internet, a cellular network, corporate networks, or even home networks, or any of the types of networks mentioned above.

Data may be transmitted and received via Network 102, 150 utilizing a standard networking protocol or a standard telecommunications protocol. For example, data may be transmitted using Session Initiation Protocol ("SIP"), Wireless Application Protocol ("WAP"), Multimedia Messaging Service ("MMS"), Enhanced Messaging Service ("EMS"), Short Message Service ("SMS"), Global System for Mobile Communications ("GSM") based systems, Code Division Multiple Access ("CDMA") based systems, Transmission Control Protocol/Internet Protocols ("TCP/IP"), hypertext transfer protocol ("HTTP"), hypertext transfer protocol secure ("HTTPS"), real time streaming protocol ("RTSP"), or other protocols and systems suitable for transmitting and receiving data. Data may be transmitted and received wirelessly or in some cases may utilize cabled network or telecom connections such as an Ethernet RJ45/Category 5 Ethernet connection, a fiber connection, a cable connection or other wired network connection.

While FIG. 1 illustrates individual devices or components, it should be appreciated that there may be several of such devices to carry out the various exemplary embodiments. Entity 130 may communicate using any mobile or computing device, such as a laptop computer, a personal digital assistant, a smartphone, a smartwatch, smart glasses, other wearables or other computing devices capable of sending or receiving network signals. User devices may have an application installed that is associated with Entity 130.

Entity 130 may be communicatively coupled to Databases 152, 154, via Database Interface 134. These storage components may include any suitable data structure to maintain the information and allow access and retrieval of the information. For example, the storage components may keep the data in an organized fashion and may be an Oracle database, a Microsoft SQL Server database, a DB2 database, a MySQL database, a Sybase database, an object oriented database, a hierarchical database, a flat database, and/or another type of database as may be known in the art to store and organize data as described herein.

The storage may be local, remote, or a combination. The storage components may utilize a redundant array of disks (RAID), striped disks, hot spare disks, tape, disk, or other computer accessible storage. In one or more embodiments, the storage may be a storage area network (SAN), an internet small computer systems interface (iSCSI) SAN, a Fiber Channel SAN, a common Internet File System (CIFS), network attached storage (NAS), or a network file system (NFS). The storage components may have back-up capability built-in. Communications with the storage components may be over a network, such as Network 102, or communications may involve a direct connection between the various storage components and Entity 130, as depicted in FIG. 1. The storage components may also represent cloud or other network based storage.

Figure 2:
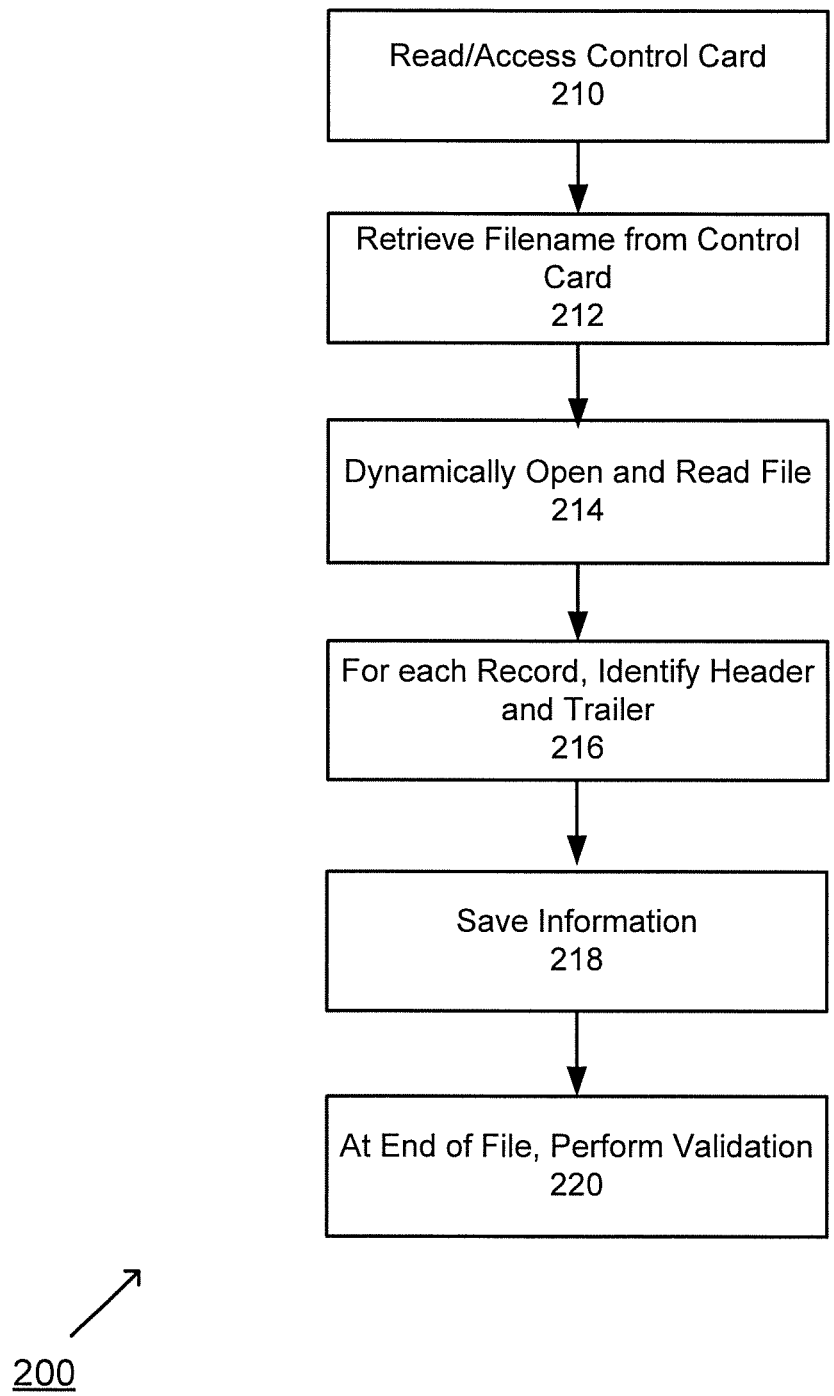
FIG. 2 is an exemplary flowchart for implementing a Header and Trailer Validation Tool, according to an embodiment of the present invention.

FIG. 2 is an exemplary flowchart for implementing a Header and Trailer Validation Tool, according to an embodiment of the present invention. At step 210, the system may read or access a control card. At step 212, a filename may be retrieved from the control card. At step 214, the system may dynamically open and read the file associated with the filename. At step 216, for each record, the system may identify a header and a trailer. At step 218, the information may be saved. At step 220, at the end of the file, a validation of the header and trailer may be performed. The order illustrated in FIG. 2 is merely exemplary. While the process of FIG. 2 illustrates certain steps performed in a particular order, it should be understood that the embodiments of the present invention may be practiced by adding one or more steps to the processes, omitting steps within the processes and/or altering the order in which one or more steps are performed. The details of the steps are described below.

At step 210, the system may read or access a control card. Reading the control card provides details concerning how to identify a header record and a trailer record. This type of information may include position, length, format, etc., which may be different for various applications. For a header record, the control card may identify where to find a date and what format the date is in where the date may vary in format. For example, date format may include YYYY-MM-DD, MM-DD-YY as well as other variations based on country, region, business, preference, and/or other factors.

At step 212, a filename may be retrieved from the control card. According to an embodiment of the present invention, the control cards may be read as the program executes, so instructions are processed in real time. The control cards may contain pertinent information about the file(s) to validate. For example, these cards may contain a name of the input file, defining characteristics of the header and trailer records, a location and format of the date in the header record, etc.

At step 214, the system may dynamically open and read the file associated with the filename. The file may have multiple individual records. Each record may identify a header, detail and trailer, among other data elements.

At step 216, for each record, the system may identify a header and a trailer. An embodiment of the present invention is directed to performing header/trailer record validation on batch files or flat files that are received from other applications. By using a Header/Trailer Validation Tool and its corresponding cataloged procedure and control cards, an embodiment of the present invention is able to add a separate step to a job to perform the header/trailer record validation. An embodiment of the present invention provides the ability to add the validation without having to change any other program in that particular job thereby minimizing development and testing.

At step 218, the information may be saved and/or otherwise retained. This will enable the Header/Trailer Validation Tool to verify the count of records.

At step 220, at the end of the file, a validation of the header and trailer may be performed. For the Header, the Header/Trailer Validation Tool may ensure the date in the header record matches the system date. For the Trailer, the Header/Trailer Validation Tool may ensure the record count in the trailer record matches the number of detail records in the file.

The batch programs normally read the entire input file, so keeping track of fields from the header and trailer records does not present any problems. However, if there were ever a reason to disable—and possibly later re-enable—the validation logic, then a user would need to update the program to apply such as change (unless the program already provides a way to do this externally).

For example, a parameter driven program and its corresponding cataloged procedure and control cards are modular and may quickly be added into any job that needs the header/trailer validation and with little disturbance to the existing process.

If any file attribute were to change, an embodiment of the present invention may update the control cards. Accordingly, there is no need to recompile the program.

An embodiment of the present invention may apply override values. For example, the override values may apply to the date format. If there is a need to apply override settings, there are a few options. For example, an override control card may be used. According to another example, override values for individual JCL parameters may be provided. According to yet another example, an appropriate row(s) in the T_CIF_PROCESS_PARAMETERS (CPP) table may be updated to apply a temporary—or even permanent—setting for a single job, a family of jobs, or all jobs that use parameter driven programs.

For example, Header/trailer validation may be applied in production in a set of jobs. In this example, the set of jobs provide critical data to downstream applications, so any enhancements made to them are tested thoroughly. When these jobs are run by testing teams in a test environment, they will often run the jobs repeatedly over several consecutive days. This testing may generally involve using the exact same set of input files over that span of days. The validation of the date in the header record may work the first day, but will fail on the second day if the file itself has not changed but the calendar day has. However, by updating the JCL to provide an override value for the MTCHDATE parameter, the program unconditionally passes the header date validation test.

Figure 3:
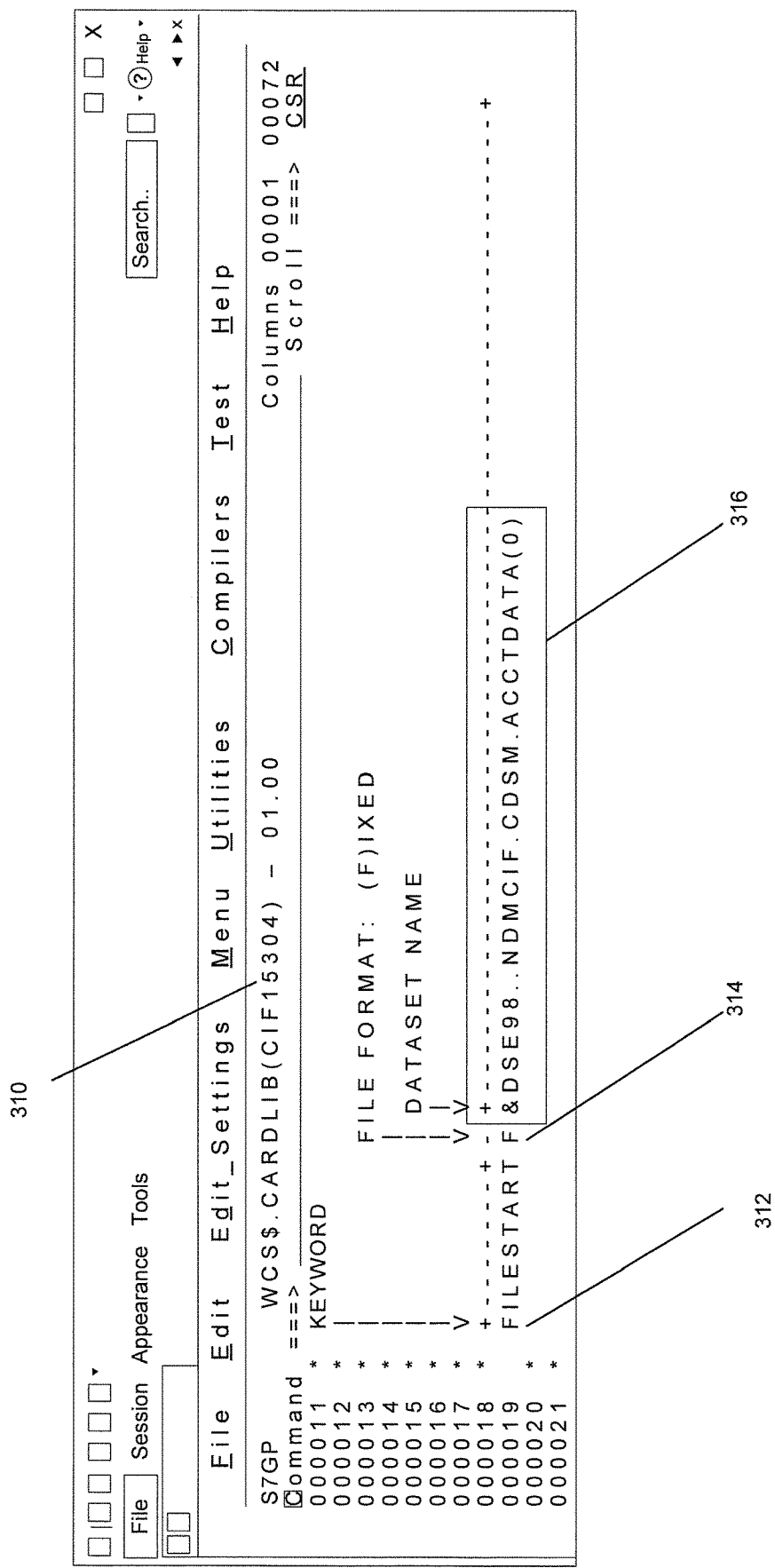
FIG. 3 is an exemplary illustration of a dynamic header trailer validation interface, according to an embodiment of the present invention.

FIG. 3 is an exemplary illustration of a dynamic header trailer validation interface, according to an embodiment of the present invention. As shown in FIG. 3, control card library member name is represented by CIF15304, at 310. CIF represents Customer Information Facility. The dataset name is &DSE98..NDMCIF.CDSM.ACCTDATA(0).

A prefix—&DSE98—may represent a JCL Symbol which is a character string that represents variable information in the JCL. When the job is submitted, the system may substitute the text for the symbol. An embodiment of the present invention may call a special program that provides access to the value dynamically and then uses it to determine the true file name. In this example, the dataset name in the exemplary production environment is: CIF$.CIF.NDMCIF.CDSM.ACCTDATA(0), as shown by 316.

Figure 4:
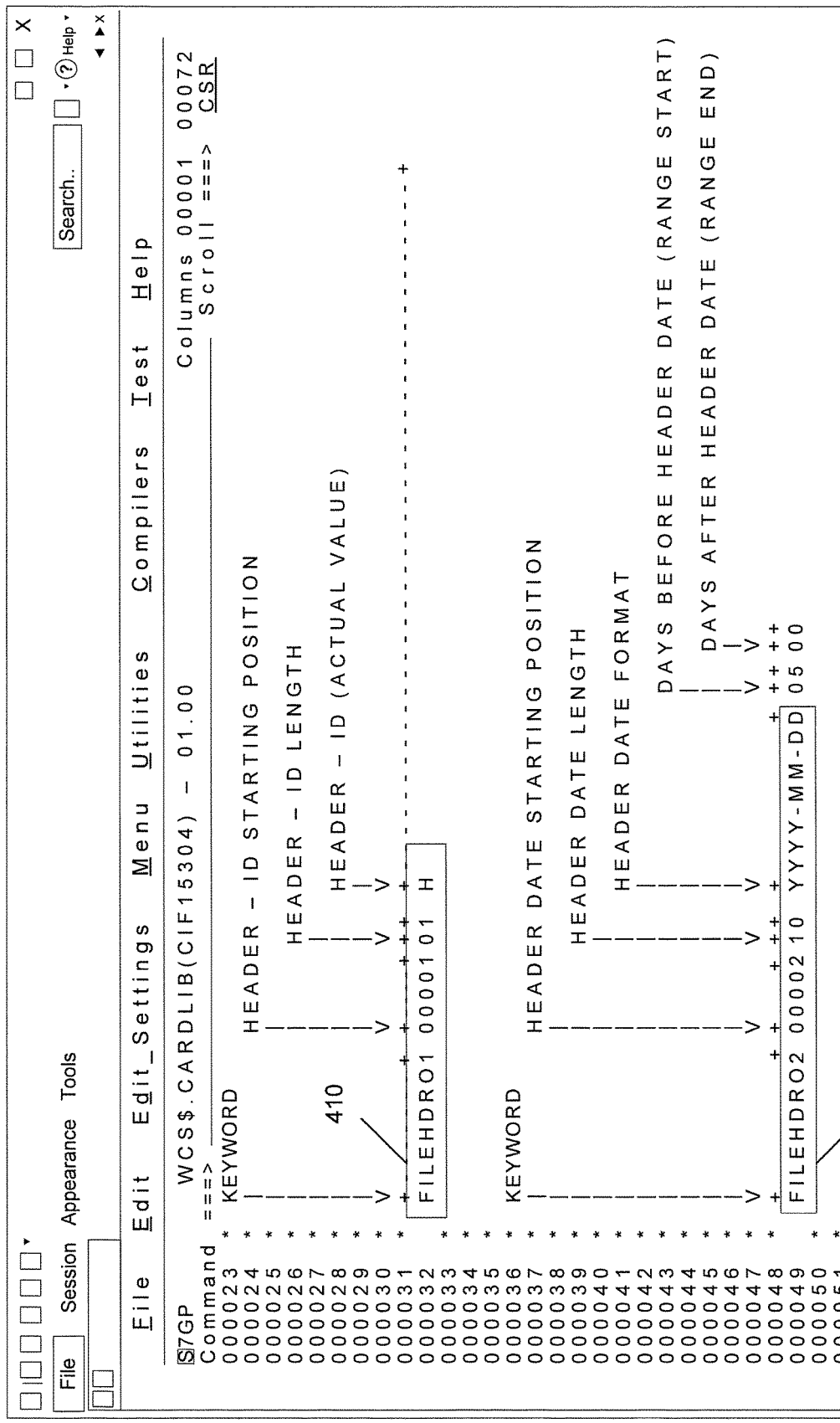
FIG. 4 is an exemplary illustration of a dynamic header trailer validation interface, according to an embodiment of the present invention.

FIG. 4 is an exemplary illustration of a dynamic header trailer validation interface, according to an embodiment of the present invention.

The FILEHDR01 (represented by 410) and FILEHDR02 (represented by 420) control cards indicate that the Header record is identified by the letter "H" in position 1 of the record, and the Date field of interest starts in position 2, is 10 characters long, and is in YYYY-MM-DD format.

Figure 5:
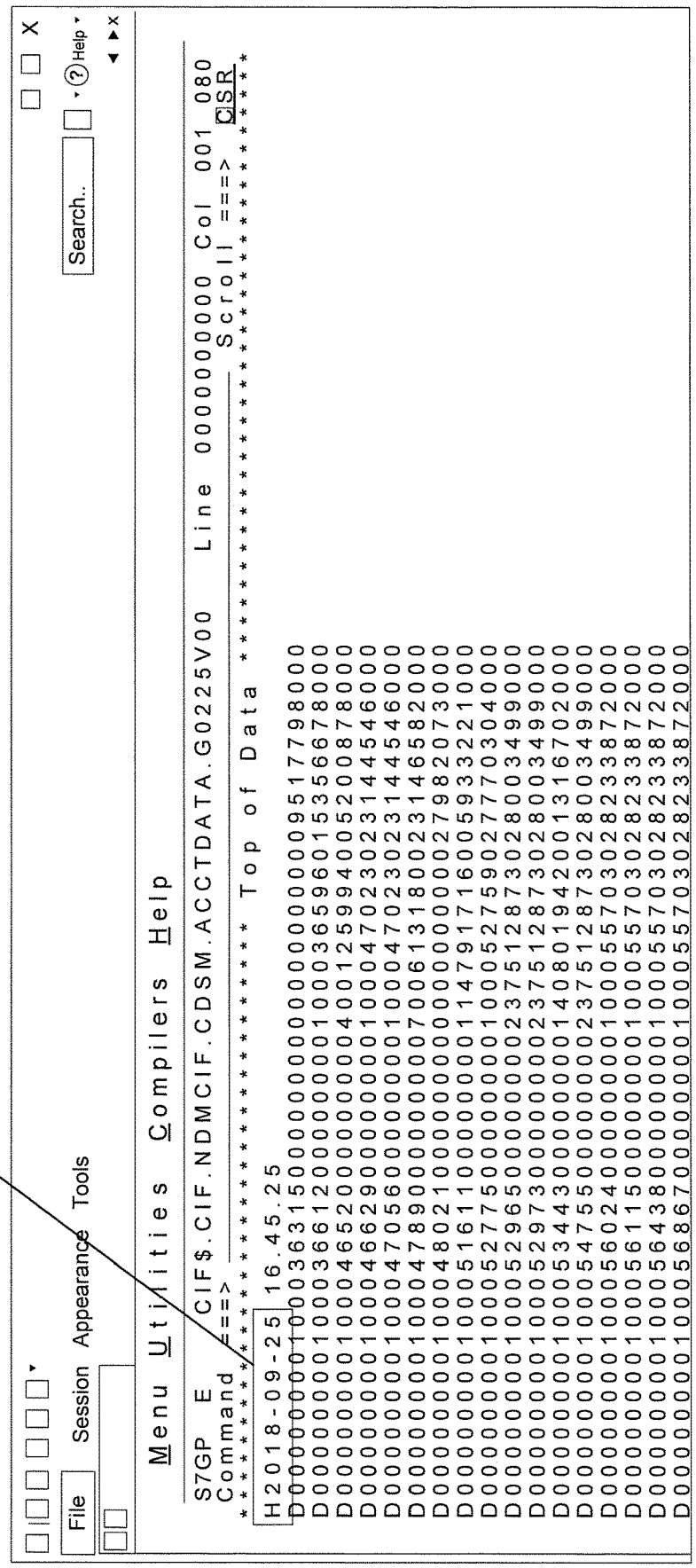
FIG. 5 is an exemplary illustration of a dynamic header trailer validation interface, according to an embodiment of the present invention.

FIG. 5 is an exemplary illustration of a dynamic header trailer validation interface, according to an embodiment of the present invention. As shown by 510, Header indicator and Date field are illustrated.

Figure 6:
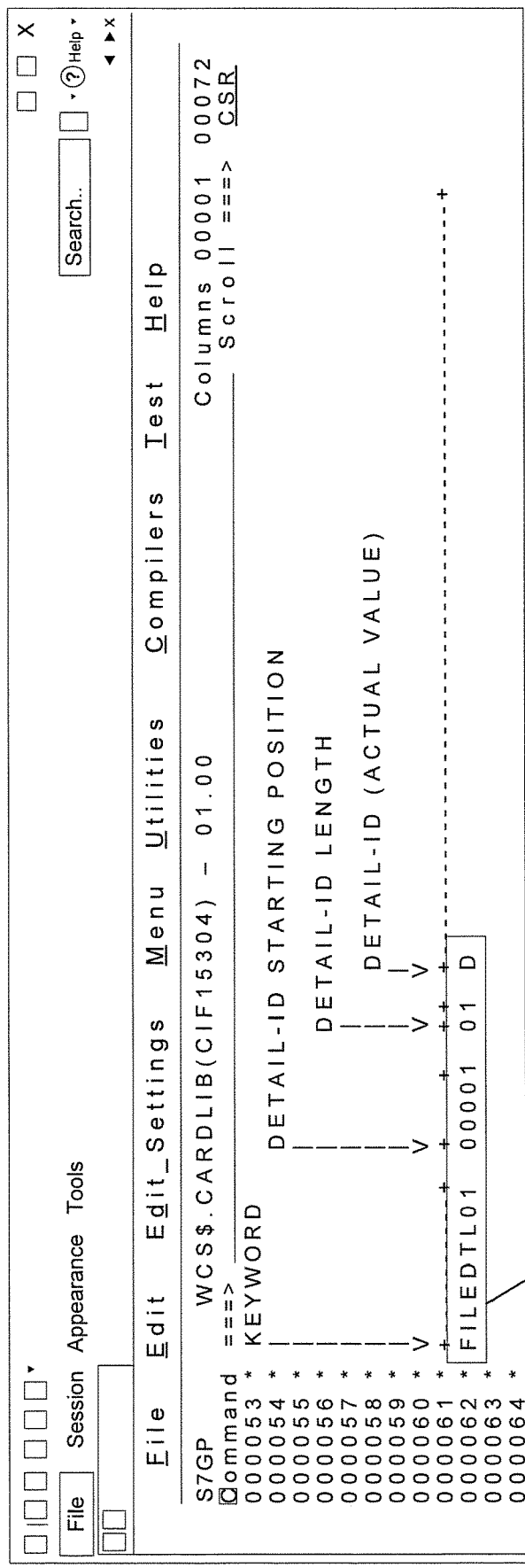
FIG. 6 is an exemplary illustration of a dynamic header trailer validation interface, according to an embodiment of the present invention.

FIG. 6 is an exemplary illustration of a dynamic header trailer validation interface, according to an embodiment of the present invention.

The FILEDTL01 control card (represented by 610) indicates that the Detail records are identified by the letter "D" in position 1 of the record.

Figure 7:
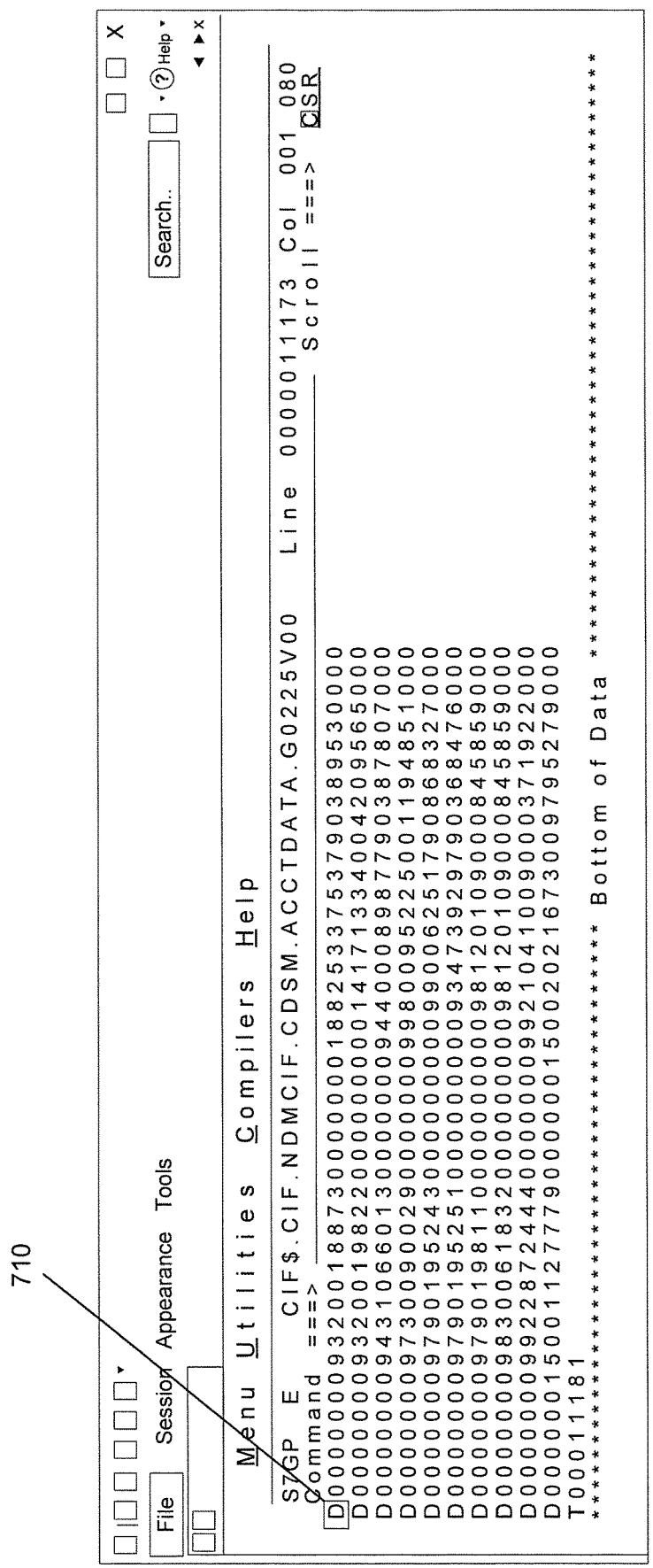
FIG. 7 is an exemplary illustration of a dynamic header trailer validation interface, according to an embodiment of the present invention.

FIG. 7 is an exemplary illustration of a dynamic header trailer validation interface, according to an embodiment of the present invention. The Detail indicator field is shown by 710.

Figure 8:
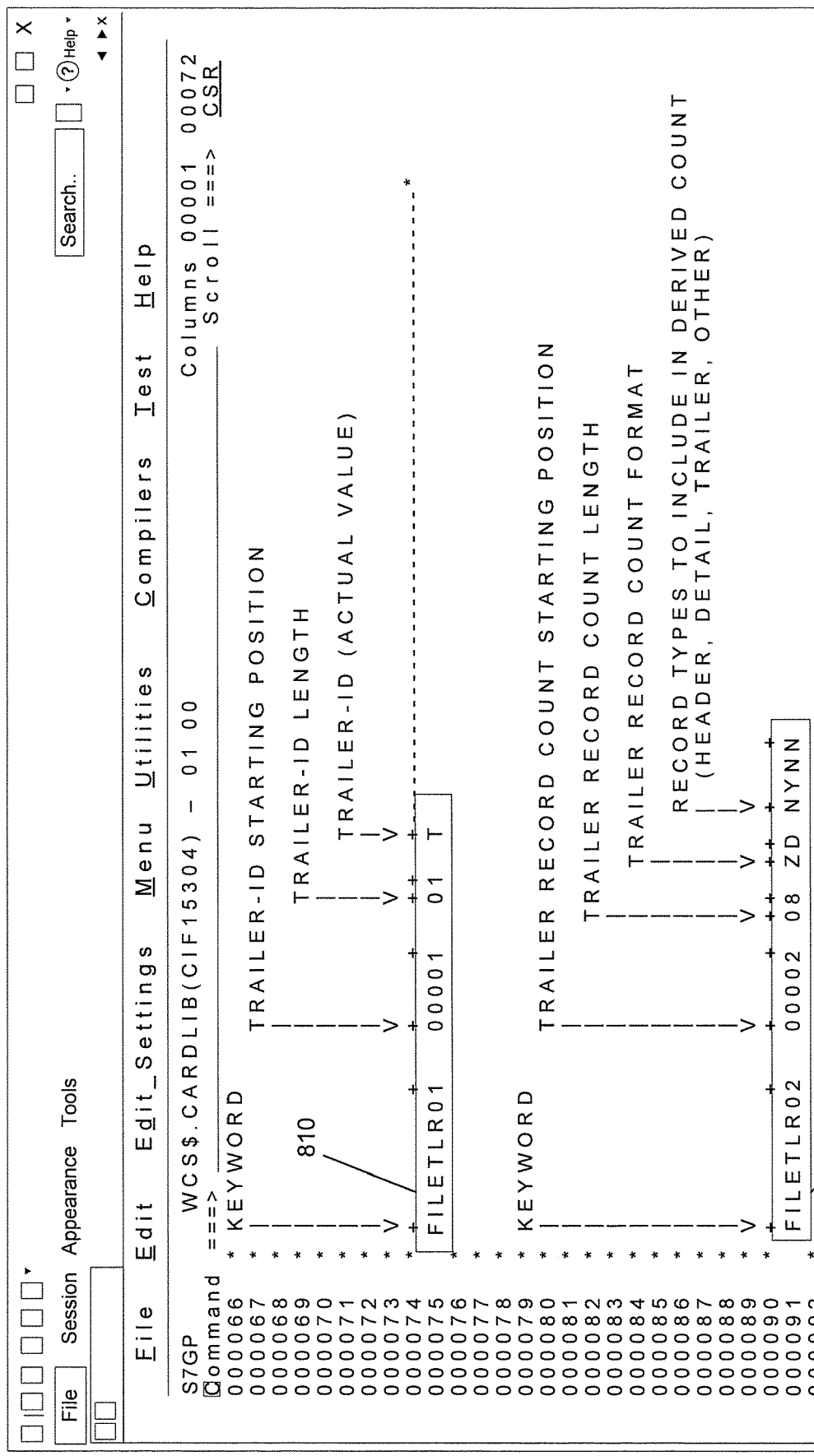
FIG. 8 is an exemplary illustration of a dynamic header trailer validation interface, according to an embodiment of the present invention.

FIG. 8 is an exemplary illustration of a dynamic header trailer validation interface, according to an embodiment of the present invention. The FILETLR01 (represented by 810) FILETLR02 (represented by 820) control cards indicate that the Trailer record is identified by the letter "T" in position 1 of the record (at 810), and the record count starts in position 2, is 8 characters long, and is in Zoned Decimal format with leading zeros as needed (at 820).

Figure 9:
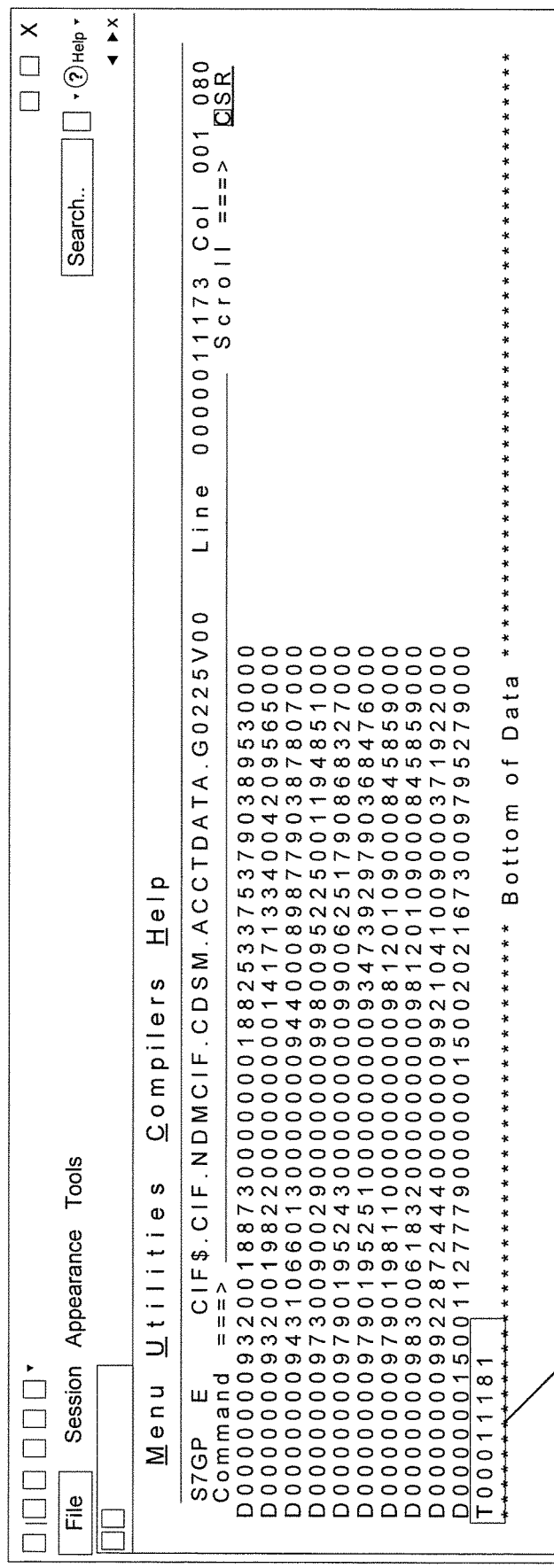
FIG. 9 is an exemplary illustration of a dynamic header trailer validation interface, according to an embodiment of the present invention.

FIG. 9 is an exemplary illustration of a dynamic header trailer validation interface, according to an embodiment of the present invention. The Trailer indicator and record count are highlighted as shown by 910.

FIGS. 3-9 illustrate a simplified example of an embodiment of the present invention. The various embodiments of the present invention may be applied to other applications, including queries performed on customer accounts by a financial institution. Other applications, services and scenarios may be implemented.

Other embodiments, uses, and advantages of the invention will be apparent to those skilled in the art from consideration of the specification and practice of the invention disclosed herein. The specification and examples should be considered exemplary only, and the scope of the invention is accordingly not intended to be limited thereby.

While the exemplary embodiments described herein may show the various embodiments of the invention (or portions thereof) collocated, it is to be appreciated that the various components of the various embodiments may be located at distant portions of a distributed network, such as a local area network, a wide area network, a telecommunications network, an intranet and/or the Internet, or within a dedicated object handling system. Thus, it should be appreciated that the components of the various embodiments may be combined into one or more devices or collocated on a particular node of a distributed network, such as a telecommunications network, for example. As will be appreciated from the following description, and for reasons of computational efficiency, the components of the various embodiments may be arranged at any location within a distributed network without affecting the operation of the respective system.

Data and information maintained by a Processor may be stored and cataloged in a Database which may comprise or interface with a searchable database. The database may comprise, include or interface to a relational database. Other databases, such as a query format database, a Standard Query Language (SQL) format database, a storage area network (SAN), or another similar data storage device, query format, platform or resource may be used. The database may comprise a single database or a collection of databases, dedicated or otherwise. In one embodiment, the database may store or cooperate with other databases to store the various data and information described herein. In some embodiments, the database may comprise a file management system, program or application for storing and maintaining data and information used or generated by the various features and functions of the systems and methods described herein. In some embodiments, the database may store, maintain and permit access to participant information, transaction information, account information, and general information used to process transactions as described herein. In some embodiments, the database is connected directly to the Processor, which, in some embodiments, it is accessible through a network, such as a communication network, for example.

Communications network may be comprised of, or may interface to any one or more of, the Internet, an intranet, a Personal Area Network (PAN), a Local Area Network (LAN), a Wide Area Network (WAN), a Metropolitan Area Network (MAN), a storage area network (SAN), a frame relay connection, an Advanced Intelligent Network (AIN) connection, a synchronous optical network (SONET) connection, a digital T1, T3, E1 or E3 line, a Digital Data Service (DDS) connection, a Digital Subscriber Line (DSL) connection, an Ethernet connection, an Integrated Services Digital Network (ISDN) line, a dial-up port such as a V.90, a V.34 or a V.34bis analog modem connection, a cable modem, an Asynchronous Transfer Mode (ATM) connection, a Fiber Distributed Data Interface (FDDI) connection, or a Copper Distributed Data Interface (CDDI) connection.

Communications network may also comprise, include or interface to any one or more of a Wireless Application Protocol (WAP) link, a General Packet Radio Service (GPRS) link, a Global System for Mobile Communication (GSM) link, a Code Division Multiple Access (CDMA) link or a Time Division Multiple Access (TDMA) link such as a cellular phone channel, a Global Positioning System (GPS) link, a cellular digital packet data (CDPD) link, a Research in Motion, Limited (RIM) duplex paging type device, a Bluetooth radio link, or an IEEE 802.11-based radio frequency link. Communications network 107 may further comprise, include or interface to any one or more of an RS-232 serial connection, an IEEE-1394 (Firewire) connection, a Fibre Channel connection, an infrared (IrDA) port, a Small Computer Systems Interface (SCSI) connection, a Universal Serial Bus (USB) connection or another wired or wireless, digital or analog interface or connection.

In some embodiments, communication network may comprise a satellite communications network, such as a direct broadcast communication system (DBS) having the requisite number of dishes, satellites and transmitter/receiver boxes, for example. Communications network may also comprise a telephone communications network, such as the Public Switched Telephone Network (PSTN). In another embodiment, communication network may comprise a Personal Branch Exchange (PBX), which may further connect to the PSTN.

In some embodiments, the processor may include any terminal (e.g., a typical personal computer system, telephone, personal digital assistant (PDA) or other like device) whereby a user may interact with a network, such as communications network, for example, that is responsible for transmitting and delivering data and information used by the various systems and methods described herein. The processor may include, for instance, a personal or laptop computer, a telephone, or PDA. The processor may include a microprocessor, a microcontroller or other general or special purpose device operating under programmed control. The processor may further include an electronic memory such as a random access memory (RAM) or electronically programmable read only memory (EPROM), a storage such as a hard drive, a CDROM or a rewritable CDROM or another magnetic, optical or other media, and other associated components connected over an electronic bus, as will be appreciated by persons skilled in the art. The processor may be equipped with an integral or connectable cathode ray tube (CRT), a liquid crystal display (LCD), electroluminescent display, a light emitting diode (LED) or another display screen, panel or device for viewing and manipulating files, data and other resources, for instance using a graphical user interface (GUI) or a command line interface (CLI). The processor may also include a network-enabled appliance, a browser-equipped or other network-enabled cellular telephone, or another TCP/IP client or other device.

The system of the invention or portions of the system of the invention may be in the form of a "processing machine," such as a general purpose computer, for example. As used herein, the term "processing machine" is to be understood to include at least one processor that uses at least one memory. The at least one memory stores a set of instructions. The instructions may be either permanently or temporarily stored in the memory or memories of the processing machine. The processor executes the instructions that are stored in the memory or memories in order to process data. The set of instructions may include various instructions that perform a particular task or tasks, such as those tasks described above in the flowcharts. Such a set of instructions for performing a particular task may be characterized as a program, software program, or simply software.

The embodiments of the present inventions are not to be limited in scope by the specific embodiments described herein. For example, although many of the embodiments disclosed herein have been described with reference to identifying events and communicating notification, the principles herein are equally applicable to other applications. Indeed, various modifications of the embodiments of the present inventions, in addition to those described herein, will be apparent to those of ordinary skill in the art from the foregoing description and accompanying drawings. Thus, such modifications are intended to fall within the scope of the following appended claims.

Further, although the embodiments of the present inventions have been described herein in the context of a particular implementation in a particular environment for a particular purpose, those of ordinary skill in the art will recognize that its usefulness is not limited thereto and that the embodiments of the present inventions can be beneficially implemented in any number of environments for any number of purposes. Accordingly, the claims set forth below should be construed in view of the full breadth and spirit of the embodiments of the present inventions as disclosed herein.

The invention claimed is:

1. A computer implemented system that implements a header and trailer validation tool for batch files, the system comprising:
   a memory interface that accesses a database table;
   an interactive interface that receives a user selection; and
   a processor, coupled to the memory interface and the interactive interface, that executes a set of JCL (Job Control Language) program lines inserted into a parameter driven program and further configured to perform the steps comprising:
   receiving a plurality of files from a plurality of applications;
   for each file, accessing a control card to identify a header format and a trailer format;
   retrieving a filename from the control card;
   dynamically reading a file corresponding to the filename;
   for each record of the file, identifying a header field based on the header format and identify a trailer field based on the trailer format;
   at the end of the file, confirming that the header field corresponds to the header format and confirm that the trailer field matches a number of records in the file; and
   wherein the trailer format includes the header field and the trailer field as part of the count.

2. The computer implemented system of claim 1, wherein the header field represents a date field.

3. The computer implemented system of claim 2, wherein the date field is specific to a geographic region.

4. The computer implemented system of claim 2, wherein the date field represents a system date.

5. The computer implemented system of claim 1, wherein the trailer field represents a numeric value that represents a number of records in the file.

6. The computer implemented system of claim 1, wherein the control card comprises a file name, one or more header record characteristics, one or more trailer record characteristics, a location and date format.

7. The computer implemented system of claim 1, wherein an override control card is implemented.

8. The computer implemented system of claim 1, wherein the plurality of applications are received from a plurality of branch locations.

9. A computer implemented method that implements a header and trailer validation tool for batch files, the method comprising the steps of:
   executing a set of JCL (Job Control Language) program lines inserted into a parameter driven program;
   receiving a plurality of files from a plurality of applications;
   for each file, accessing a control card to identify a header format and a trailer format;
   retrieving a filename from the control card;
   dynamically reading a file corresponding to the filename;
   for each record of the file, identifying a header field based on the header format and identify a trailer field based on the trailer format;
   at the end of the file, confirming that the header field corresponds to the header format and confirm that the trailer field matches a number of records in the file; and
   wherein the trailer format includes the header field and the trailer field as part of the count.

10. The computer implemented method of claim 9, wherein the header field represents a date field.

11. The computer implemented method of claim 10, wherein the date field is specific to a geographic region.

12. The computer implemented method of claim 10, wherein the date field represents a system date.

13. The computer implemented method of claim 9, wherein the trailer field represents a numeric value that represents a number of records in the file.

14. The computer implemented method of claim 9, wherein the control card comprises a file name, one or more header record characteristics, one or more trailer record characteristics, a location and date format.

15. The computer implemented method of claim 9, wherein an override control card is implemented.

16. The computer implemented method of claim 9, wherein the plurality of applications are received from a plurality of branch locations.

\* \* \* \* \*